United States Patent [19]
Harrington et al.

[11] Patent Number: 5,994,770
[45] Date of Patent: *Nov. 30, 1999

[54] PORTABLE ELECTRONIC DATA CARRIER

[75] Inventors: Bradley M. Harrington, Carrollton; Hal Kurkowski, Dallas; James P. Cusey, McKinney, all of Tex.

[73] Assignee: Dallas Semiconductor Corporation, Dallas, Tex.

[*] Notice: This patent is subject to a terminal disclaimer.

[21] Appl. No.: 08/847,533

[22] Filed: Apr. 24, 1997

Related U.S. Application Data

[63] Continuation of application No. 08/262,071, Jun. 15, 1994, abandoned, which is a continuation of application No. 07/725,793, Jul. 9, 1991, abandoned.

[51] Int. Cl.$^6$ ................................................ G06K 19/06
[52] U.S. Cl. .................... 257/679; 239/492; 257/730; 257/732
[58] Field of Search ................... 257/678, 679, 257/699, 700, 709, 710, 708, 729; 235/492

[56] References Cited

U.S. PATENT DOCUMENTS

| | | | |
|---|---|---|---|
| 3,335,327 | 8/1967 | Damon et al. | 361/403 |
| 3,502,905 | 3/1970 | Bicking | 307/570 |
| 3,846,971 | 11/1974 | Ho et al. | 368/88 |
| 3,859,638 | 1/1975 | Hume, Jr. | 365/229 |
| 3,986,051 | 10/1976 | Okada et al. | 307/296.1 |
| 3,996,735 | 12/1976 | Zurcher | 368/88 |
| 4,007,355 | 2/1977 | Moreno | 235/492 |
| 4,048,478 | 9/1977 | Miwa et al. | 377/15 |
| 4,053,688 | 10/1977 | Perkins et al. | 368/88 |
| 4,064,689 | 12/1977 | Yasuda et al. | 368/88 |
| 4,084,236 | 4/1978 | Chelberg et al. | 364/800 |
| 4,086,752 | 5/1978 | Kishimoto | 368/88 |
| 4,140,930 | 2/1979 | Tanaka | 307/272.3 |
| 4,142,114 | 2/1979 | Green | 307/296.8 |
| 4,168,531 | 9/1979 | Eichelberger et al. | 377/26 |
| 4,169,642 | 10/1979 | Mouissie | 361/383 X |
| 4,196,577 | 4/1980 | Ohno et al. | 368/82 |
| 4,211,919 | 7/1980 | Ugon | 235/488 |
| 4,239,558 | 12/1980 | Morishita et al. | 148/175 |
| 4,272,838 | 6/1981 | Kasama et al. | 368/88 |
| 4,363,125 | 12/1982 | Brewer et al. | 371/71 |
| 4,399,524 | 8/1983 | Mugurama | 365/229 |
| 4,400,711 | 8/1983 | Avery | 357/48 |
| 4,426,159 | 1/1984 | Kosaka et al. | 368/88 |
| 4,471,345 | 9/1984 | Barrett, Jr. | 340/825.32 X |
| 4,472,215 | 9/1984 | Daughters et al. | 235/487 |
| 4,473,825 | 9/1984 | Walton | 340/825.54 |
| 4,475,178 | 10/1984 | Kinoshika | 365/203 |
| 4,480,178 | 10/1984 | Miller et al. | 235/380 |
| 4,486,770 | 12/1984 | Woodward | 357/48 |

(List continued on next page.)

FOREIGN PATENT DOCUMENTS

| | | | |
|---|---|---|---|
| 0147099 | 3/1985 | European Pat. Off. | |
| 62-125659 | 6/1987 | Japan | 357/48 |
| 63-190374 | 8/1988 | Japan | 357/48 |

OTHER PUBLICATIONS

Sedra, Adel A. and Kenneth C. Smith, Microelectronic Circuits, 1982, p. 358.
Aoki, et al. FAM 16.1: A.1.5.V DRAM for Battery–Based Applications, 1989 IEEE International Solid State Circuits Conference Digest of Technical Papers, pp. 238, 239, 349.
IBM Tech. Disc. Bul. vol. 19, No. 8, 1/72 "Bouncing Switch Output to Single–Pulse Converter in 4–phase logic" Radzik 307542.1.

*Primary Examiner*—Jack A. Lane
*Attorney, Agent, or Firm*—Jenkens & Gilchrist P.C.

[57] ABSTRACT

An apparatus includes a circuit positioned in a housing, which circuit includes an input/output module having a parasitic power sub-module. The circuit further includes a scratchpad memory, coupled to the input/output module; a programmable memory, coupled to the scratchpad memory; and a control module, coupled to the input/output module, the scratchpad memory and the programmable memory. In certain variations, the input/output module further includes at least one of a one-wire bus and a three-wire bus in addition to a bus arbitrator.

30 Claims, 11 Drawing Sheets

U.S. PATENT DOCUMENTS

| | | | |
|---|---|---|---|
| 4,511,796 | 4/1985 | Aigo | 235/492 |
| 4,531,064 | 7/1985 | Levine | 377/32 |
| 4,546,455 | 10/1985 | Iwahastic et al. | 365/200 |
| 4,556,958 | 12/1985 | Ugon | 235/492 X |
| 4,583,111 | 4/1986 | Early | 307/303.2 |
| 4,595,941 | 6/1986 | Avery | 357/23.13 |
| 4,616,343 | 10/1986 | Ogawa | 365/203 |
| 4,617,473 | 10/1986 | Bingham | 365/229 |
| 4,618,857 | 10/1986 | Dubois et al. | 307/66 |
| 4,621,190 | 11/1986 | Saito et al. | 235/492 |
| 4,631,567 | 12/1986 | Kokado et al. | 357/23.13 |
| 4,642,667 | 2/1987 | Magee | 357/35 |
| 4,645,943 | 2/1987 | Smith, Jr. et al. | 307/150 |
| 4,658,352 | 4/1987 | Nagasawa | 364/200 |
| 4,682,829 | 7/1987 | Kunkle et al. | 439/70 X |
| 4,683,372 | 7/1987 | Matsumoto | 235/492 |
| 4,688,036 | 8/1987 | Hirano et al. | 340/825.54 X |
| 4,691,202 | 9/1987 | Dume et al. | 340/825.54 |
| 4,709,202 | 11/1987 | Koenck et al. | 340/636 |
| 4,713,555 | 12/1987 | Lee | 307/66 |
| 4,717,817 | 1/1988 | Grass | 235/441 |
| 4,724,427 | 2/1988 | Carroll . | |
| 4,730,121 | 3/1988 | Lee et al. | 307/66 |
| 4,742,470 | 5/1988 | Jueugel | 340/825.54 X |
| 4,748,320 | 5/1988 | Yorimoto et al. | 235/492 |
| 4,767,918 | 8/1988 | Kushima et al. | 235/441 |
| 4,780,707 | 10/1988 | Selker | 235/472 |
| 4,800,590 | 1/1989 | Vaughan | 380/25 |
| 4,809,221 | 2/1989 | Magliocco et al. | 377/44 |
| 4,810,975 | 3/1989 | Dias | 331/78 |
| 4,815,112 | 3/1989 | Kuze | 377/26 |
| 4,816,656 | 3/1989 | Nakano et al. | 235/380 |
| 4,827,478 | 5/1989 | Chan | 371/38 |
| 4,833,350 | 5/1989 | Frisch | 307/475 |
| 4,845,351 | 7/1989 | Hara et al. | 235/492 |
| 4,845,609 | 7/1989 | Lighthurt et al. | 395/425 |
| 4,853,560 | 8/1989 | Iwamura et al. | 307/475 X |
| 4,855,690 | 8/1989 | Dias | 331/78 |
| 4,855,803 | 8/1989 | Azumai et al. | 365/96 X |
| 4,862,310 | 8/1989 | Harrington, III | 357/48 |
| 4,862,501 | 8/1989 | Kamitake et al. | 380/50 |
| 4,868,409 | 9/1989 | Tanaka et al. | 70/278 |
| 4,870,401 | 9/1989 | Lee et al. | 340/825.31 |
| 4,871,982 | 10/1989 | Williams et al. | 331/75 |
| 4,874,965 | 10/1989 | Compardo et al. | 307/279 |
| 4,878,220 | 10/1989 | Hashimoto | 371/40.1 |
| 4,882,474 | 11/1989 | Anderl et al. | 235/492 |
| 4,885,788 | 12/1989 | Takaragi et al. | 380/23 |
| 4,887,234 | 12/1989 | Iijima | 395/425 |
| 4,887,292 | 12/1989 | Barrett et al. | 379/103 |
| 4,897,564 | 1/1990 | Chen | 307/475 |
| 4,902,237 | 2/1990 | Huetson | 361/405 X |
| 4,908,790 | 3/1990 | Little et al. | 365/229 |
| 4,912,435 | 3/1990 | Williams et al. | 331/75 |
| 4,928,000 | 5/1990 | Eglise et al. | 235/380 |
| 4,928,001 | 5/1990 | Masada | 235/380 |
| 4,935,899 | 6/1990 | Morigami | 365/200 |
| 4,943,804 | 7/1990 | Lee et al. | 340/825.34 |
| 4,947,163 | 8/1990 | Henderson et al. | 340/825.31 |
| 4,948,954 | 8/1990 | Dias | 235/492 |
| 4,967,108 | 10/1990 | Lee et al. | 307/556 |
| 4,970,408 | 11/1990 | Hanke et al. | 307/272.3 |
| 4,980,746 | 12/1990 | Harrington, III | 357/48 |
| 4,982,371 | 1/1991 | Bolan et al. | 365/228 |
| 4,982,892 | 1/1991 | Darla et al. | 174/261 X |
| 4,984,291 | 1/1991 | Dias et al. | 455/343 |
| 4,988,987 | 1/1991 | Barrett et al. | 340/825.21 |
| 4,989,261 | 1/1991 | Lee | 455/127 |
| 4,995,004 | 2/1991 | Lee | 365/189.11 |
| 5,010,331 | 4/1991 | Dias et al. | 340/825.31 |
| 5,013,898 | 5/1991 | Glasspool | 235/449 |
| 5,019,736 | 5/1991 | Furtek | 307/303.2 |
| 5,027,008 | 6/1991 | Runaldue | 307/272.3 |
| 5,032,208 | 7/1991 | Comerford et al. | 235/492 |
| 5,038,299 | 8/1991 | Maeda | 364/519 |
| 5,039,875 | 8/1991 | Chang | 307/272.3 |
| 5,045,675 | 9/1991 | Curry | 235/441 |
| 5,049,728 | 9/1991 | Rovin | 235/492 |
| 5,051,897 | 9/1991 | Yamaguchi et al. | 364/800 |
| 5,111,058 | 5/1992 | Martin | 365/229 |
| 5,121,359 | 6/1992 | Steele | 365/229 |
| 5,151,622 | 9/1992 | Thrower et al. | 307/451 X |
| 5,177,742 | 1/1993 | Herzberger | 370/112 |
| 5,179,298 | 1/1993 | Hirano et al. | 307/443 |
| 5,276,367 | 1/1994 | Maekawa | 307/443 X |

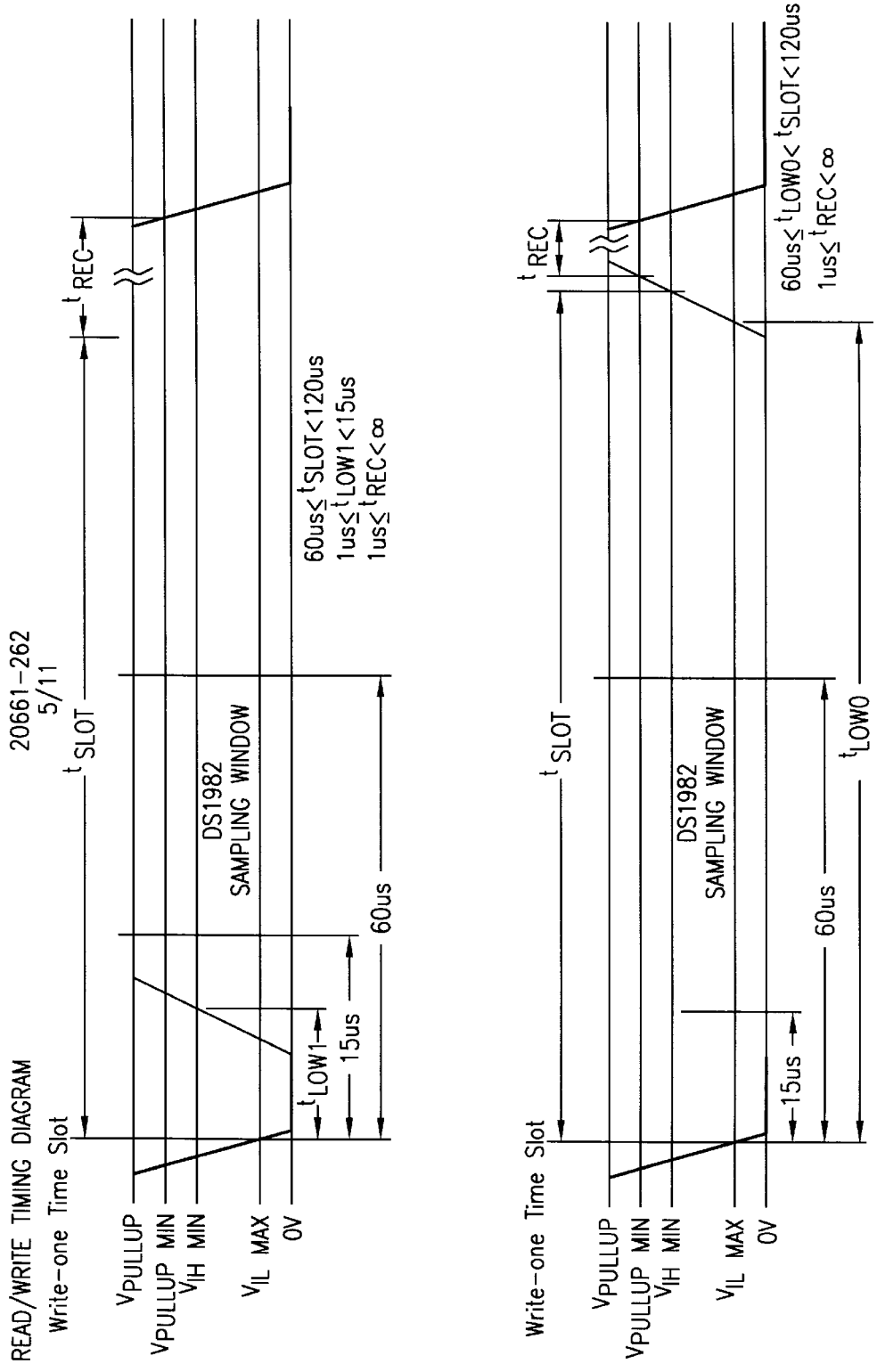
FIG. 1L-1 (READ/WRITE TIMING DIAGRAM CONTINUED ON FIG. 1L-2)

PIN ASSIGNMENT

F3 PACKAGE

F5 PACKAGE

BOTTOM VIEW

PORTABLE ELECTRONIC DATA CARRIER

CROSS-REFERENCE TO RELATED APPLICATIONS

The application is a continuation-in-part of co-assigned, patent application entitled "Serial Port Memory for an Electronic Token (as amended)", that has U.S. Ser. No. 725,793, which was filed on Jul. 9, 1991, now abandoned, by Steve Curry, Mike Bolan, Kevin Deierling, Bill Payne, Hal Kurkowski, Don Dias, Gary Zanders, Bob Lee, and Guenter Lehmann, incorporated by reference herein. This application hereby incorporates by reference the following co-assigned issued patents and patent applications, which describe in great detail the operation of the technology surrounding Touch Memory™ processes and systems, which was developed by employees at Dallas Semiconductor Corporation:

| Patent No. | Filing Date/ Issue Date | Authors |
| --- | --- | --- |
| 4,862,310 | 04-29-88/08-29-89 | Harrington |
| 5,210,846 | 05-15-89/05-11-93 | Lee |
| 08/019,932 | 02-19-93 | Lee |
| 4,982,371 | 05-15-89/01-01-91 | Lee et al. |
| 07/632,227 | 12-20-90 | Lee et al. |
| 5,091,771 | 05-15-89/11-18-91 | Bolan et al. |
| 4,972,377 | 05-15-89/11-20-90 | Lee |
| 5,191,554 | 08-27-91/03-02-93 | Lee |
| 5,181,091 | 09-16-91/01-19-93 | Harrington et al. |
| 4,945,217 | 05-15-89/07-31-90 | Bolan |
| 5,025,141 | 07-17-90/06-18-91 | Bolan |
| 4,948,954 | 05-15-89/08-14-90 | Dias |
| 4,983,820 | 08-14-90/01-08-91 | Dias |
| 5,045,675 | 05-15-89/09-03-91 | Steve Curry |
| 4,995,004 | 05-15-89/02-19-91 | Lee |
| 07/657,717 | 02-19-91 | Lee |
| 07/725,793 | 07-09-91 | Curry et al. |
| 07/998,978 | 12-30-92 | Curry et al. |
| 07/527,492 | 05-22-90 | Bolan et al. |
| 5,206,905 | 11-19-90/04-27-93 | Lee et al. |
| 07/615,615 | 11-19-90 | Lee et al. |
| 5,226,137 | 11-19-90/07-06-93 | Lee et al. |
| 07/882,244 | 05-08-92 | Lee |
| 07/631,929 | 12-19-90 | Curry et al. |
| 07/728,230 | 07-10-91 | Pearson et al. |
| 07/727,618 | 07-10-91 | Williams et al. |
| 07/727,619 | 07-10-91 | Rodriguez et al. |
| 07/727,638 | 07-10-91 | Ni et al. |
| 08/103,724 | 08-09-93 | Pearson et al. |
| 07/727,639 | 07-10-91 | Bolan et al. |
| 5,166,545 | 07-10-91/11-24-92 | Harrington |
| 08/022,258 | 02-24-93 | Bolan et al. |
| 08/031,776 | 03-15-93 | Bolan et al. |
| 08/015,506 | 02/09/93 | Harrington et al. |
| 08/234,210 | 04/28/94 | Fekete et al. |
| | 05/24/94 | Curry et al. |

In addition, Applicants also incorporate by reference the Appendix A, which includes the DC and AC electrical characteristics for preferred embodiments, as well as the Book of DS199x Touch Memory™ Standards and Book of DS19xx Touch Memory™ Standards, which are both published by Dallas Semiconductor Corporation, but are not included in the Appendix.

PARTIAL WAIVER OF COPYRIGHT PURSUANT TO 1077 O.G. 22(Mar. 20, 1987)

(C) Copyright, Dallas Semiconductor Corporation 1994. All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

FIELD OF INVENTION

The present invention relates to electronic devices, and, more particularly, to portable semiconductor circuits.

SUMMARY OF THE INVENTIONS

The present invention relates to compact electronic modules and to components and packaging for use with such modules. The numerous innovations disclosed herein are believed to contribute a major advance in this direction.

Generally, a circuit positioned in a substantially token-shaped body, the circuit comprises a serial port to receive and transmit information, a scratchpad memory coupled to the serial port to hold information that is received or transmitted, an electrically programmable memory coupled to the scratchpad memory, a program port to receive program information and program the electrically programmable memory; and control logic coupled to the serial port and the scratchpad memory and the electrically programmable memory, the control logic transfers information to and from the scratchpad memory to the electrically programmable memory as a block (e.g., 8 bits) pursuant to a block transfer command received at the serial port. The serial port and the program port are combined into a single port, so that all signals corresponding to receiving and transmitting information are multiplexed together on a single data line. The electrically programmable memory is also read only memory.

The electronic token preferably has a first electrically conductive surface and a second electrically conductive surface that combine to create a hollow cavity. The serial port, the scratchpad memory, the program port, the electrically programmable memory, and the control logic are positioned inside the hollow cavity. The first conductive surface and the second conductive surface can be electrically coupled to transmit electrical signals generated by said serial port, the scratchpad memory, the program port, the electrically programmable memory, the control logic. The first and second conductive surface also work together to receive externally generated electrical signals. Portions of the first electrically conductive surface and the second electrically conductive surface are preferably planar. The control logic allows access to a generated cyclic redundancy check value. The serial port, the scratchpad memory, the electrically programmable memory and the control logic may also be combined into an integrated circuit that is mounted on a very small printed circuit board. The scratchpad memory has a first size and the electrically programmable memory has a second size (e.g., 1K bits).

A bus master module may also be coupled to the serial port and controls communication to and from the serial port. The bus master module holds a data line to a first voltage level for a first time period, creates a transition between the first voltage level and a second voltage level, holds the data line at the second voltage for a second time period; and samples the voltage level of the data line to determine whether the data value is a first data value or a second data value at a first sample time. The first time period is at least one microsecond. The first voltage is approximately five volts and corresponds to a logic high level. The voltage level differences are approximately 5 volts and are created by a first voltage level and a second voltage level, the first and second voltage levels correspond to a logical high and a logical low. The second voltage is approximately ground and corresponds to a logic low level. The transition provides a coordinating time from which the memory coordinates internal operations. The second time period is at least one microsecond. The first sample time is at least 30 microseconds from the transition. The master bus module holds a data line coupled to the serial port via a first electrically conductive surface to a first voltage level for a first time period, creates a transition between the first voltage level and a second voltage level, holds the first data line to the second voltage for a second time period, and samples the voltage level of the data line by the master bus module to determine whether the data value is a first data value or a second data value at a first time. Higher voltages on the first and second conductive surface are used to indicate a program state and program signals. Similar communication protocol applies to these signals as well.

The electrically programmable memory is divided into a plurality of memory subsections, all of which are coupled to the scratchpad memory and the control logic. The control logic transfers information to and from the scratchpad memory to the plurality of memory subsections of the electrically programmable memory as a block pursuant to a block transfer command received at the serial port. At least four memory subsections comprise the plurality of memory. The serial port, the scratchpad memory, the electrically programmable memory and the control logic are preferably powered by voltage intermittently applied between the first and second electrically conductive surface areas. Preferred embodiments also have a capacitor for storing energy from the voltage intermittently applied between the first and second electrically conductive surface areas. The serial port, the scratchpad memory, the electrically programmable memory and the control logic are preferably integrated on a monolithic piece of silicon. The serial port, the scratchpad memory, the electrically programmable memory and the control logic are preferably packaged in a low-height package that is selected from the group consisting of a flat pack and small out-line integrated circuit, and any combination thereof.

Regarding the token, which is preferably comprised of metal, the first electrically conductive surface comprises a first flat face and the second electrically conductive surface comprises a second flat face parallel to the first flat face; and a portion of a first electrically conductive surface which is approximately perpendicular to the first flat face and the second flat face. In fact, the substantially token-shaped body may only the first and second electrically conductive surface. The substantially token-shaped body is approximately 6 mm in diameter and approximately 3 mm thick. The substantially token-shaped body is preferably button-shaped and has a flange extending from a perimeter of the substantially token-shaped body. The substantially token-shaped body is preferably mountable to a physical item. While potential items are numerous, the item is selected from the group consisting of maintenance records, retail products, machinery, cards, personnel identification badges, and any combination thereof. The substantially token-shaped body is comprised of metal.

Preferred embodiments also have a voltage level detector coupled to the first and second areas for receiving signals applied as voltage level differences between the first and second electrically conductive surface areas; and a switch connecting the first and second electrically conductive surface areas for sending signals by changing a resistance between the first and second electrically conductive surfaces. A voltage level detector is also coupled to the first and second areas for receiving signals applied as voltage level differences between the first and second electrically conductive surface areas, the voltage level differences interpreted by the program port and used to program the electrically programmable memory. The electrically programmable memory comprises at least one memory cell, each memory cell comprising a first transistor having a gate, source and drain, the circuit further comprising a voltage clamping circuit that directs and adjust a first and second voltage to the gate and the drain, both of which have been derived from a program voltage received by the program port. The single port comprises a voltage switch circuit detects voltage differences received at the single port and interprets the voltage difference to determine whether it should be directed to reading the electrically programmable memory or to program the electrically programmable memory. If the voltage switch determines the voltage difference should be used to program the electrically programmable memory, the voltage switch activates circuitry to adjust the voltage difference to run other circuitry comprised in the circuit. Similarly, blocks of memory in the electrically programmable memory can also be used to redirect data requests to other locations in the electrically programmable memory. In particular, the memory subsections comprise a block of memory, the block of memory redirects data requests to other locations in the memory subsections. A protection circuit to protect the scratchpad memory, the electrically programmable memory coupled to the scratchpad memory, and the control logic from electrostatic discharge.

There are numerous advantages to the inventions described herein. First, 1024-bits Electrically Programmable Read Only Memory (EPROM) communicates with the economy of one signal plus ground. EPROM partitioned into four 256-bit pages for randomly accessing packetized data records, each of which can be permanently write-protected to prevent tampering. As a result, preferred system embodiments provide "add only" memory where additional data can be programmed into EPROM without disturbing existing data. The architecture of preferred system embodiments allows software to patch data by superseding an old page in favor of a newly programmed page. Preferred system embodiments reduce control, address, data, power, and programming signals to a single data pin. An 8-bit family code specifies communications requirements to reader. Preferred system embodiments read over a wide voltage range of 2.8V to 6.0V from −40° C. to +85° C.; program at 11.5V±0.5V from −40° C. to 85° C.

In addition, preferred system embodiments also implement common Touch Memory™ features that are described in detail in the patents and patent applications incorporated by reference hereinabove. In particular, unique, factory-lasered and tested 64-bit registration numbers (8-bit family code+48-bit serial number+8-bit CRC tester) assure absolute traceability because no two parts are alike. Digital identification and information by momentary contact. Chip-based data carrier compactly stores information. Data can be accessed while affixed to object. Economically communicates to bus master with a single digital signal at 16.3k bits per second. Standard 16 mm diameter and 1-Wire protocol ensure compatibility with Touch Memory™ family of products manufactured by Dallas Semiconductor Corporation. Button shape is self-aligning with cup-shaped probes. Durable stainless steel case engraved with registration number withstands harsh environments. Easily affixed with self-stick adhesive backing, latched by its flange, or locked with a ring pressed onto its rim. Presence detector acknowledges when reader first applies voltage. Preferred embodiments are expected to meet UL#913 (4th Edit.); Intrinsically Safe Apparatus, Approved under Entity Concept for use in Class 1, Division 1, Group A, B, C and D Locations.

BRIEF DESCRIPTION OF THE DRAWINGS

Further features and advantages will become apparent from the following and more particular description of the various embodiments of the invention, as illustrated in the accompanying drawings, wherein.

DETAILED DESCRIPTION OF THE PREFERRED EMBODIMENTS

Preferred system embodiments of the 1K-bit EPROM Touch Memory™ system are rugged read/write data carriers that identify and store relevant information about the product or person to which it is attached. This information can be accessed with minimal hardware, for example a single port pin of a micro-controller. Preferred system embodiments consist of a factory-lasered registration number that include a unique 48-bit serial number, an 8-bit CRC, and an 8-bit Family Code (09h) plus 1K-bit of EPROM which is user-programmable. The power to program and read preferred system embodiments is derived entirely from the 1-Wire™ communication line. Data is transferred serially via the 1-Wire™ protocol which requires only a single data lead and a ground return. The entire device can be programmed and then write-protected if desired. Alternatively, unprogrammed portions of the part may be programmed with new data with each subsequent programming of the device. Note individual bits can be changed only from a logical 1 to a logical 0, never from a logical 0 to a logical 1. A provision is also included for indicating that a certain page or pages of data are no longer valid and have been replaced with new or updated data that is now residing at an alternate page address. This page address redirection allows software to patch data and enhance the flexibility of the device as a standalone database. The 48-bit serial number that is factory-lasered into each preferred system embodiment provides a guaranteed unique identity which allows for absolute traceability. The durable MicroCan™ package is highly resistant to harsh environments such as dirt, moisture, and shock. Its compact button-shaped profile is self-aligning with cup-shaped receptacles, allowing preferred system embodiments to be used easily by human operators or automatic equipment. Accessories permit preferred system embodiments to be mounted on printed circuit boards, plastic key fobs, photo-ID badges, ID bracelets, and many other objects. Applications include work-in-progress tracking, electronic travelers, access control, storage of calibration constants, and debit tokens.

Figure 1A:
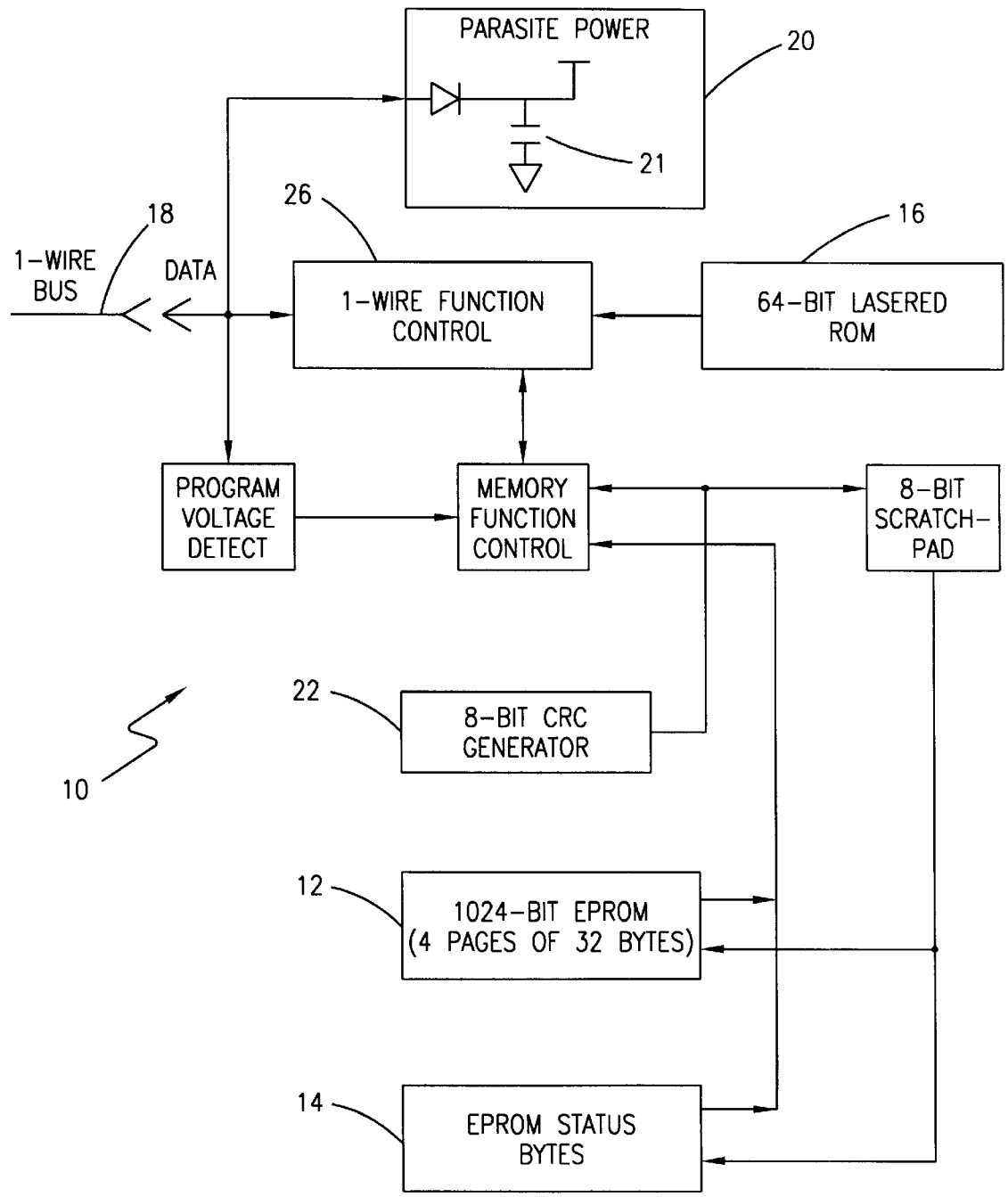
FIG. 1A is a block diagram that shows the relationships between the major control and memory sections of preferred system embodiments.

The block diagram in FIG. 1A shows the relationships between the major control and memory sections of preferred system embodiments 10. Preferred system embodiments 10 generally have three main data components; 1) 64-bit lasered ROM 16, 2) 1024-bit EPROM 12, and 3) EPROM Status Bytes 14. Device 10 derives its power for read operations entirely from the 1-Wire™ communication line 18 by storing energy on an internal capacitor 21 during periods of time when the signal line is high and continues to operate off of this "parasite" power source during the low times of the 1-Wire line until it returns high to replenish the parasite (capacitor) supply 20. During programming, 1-Wire™ communication occurs at normal voltage levels and then is pulsed momentarily to the programming voltage to cause the selected EPROM bits to be programmed. The 1-Wire™ line must be able to provide 12 volts and 10 milliamperes to adequately program the EPROM portions of the part. Whenever programming voltages are present on the 1-Wire™ line a special high voltage detect circuit within the preferred system embodiment 10 generates an internal logic signal to indicate this condition.

Figure 1B:
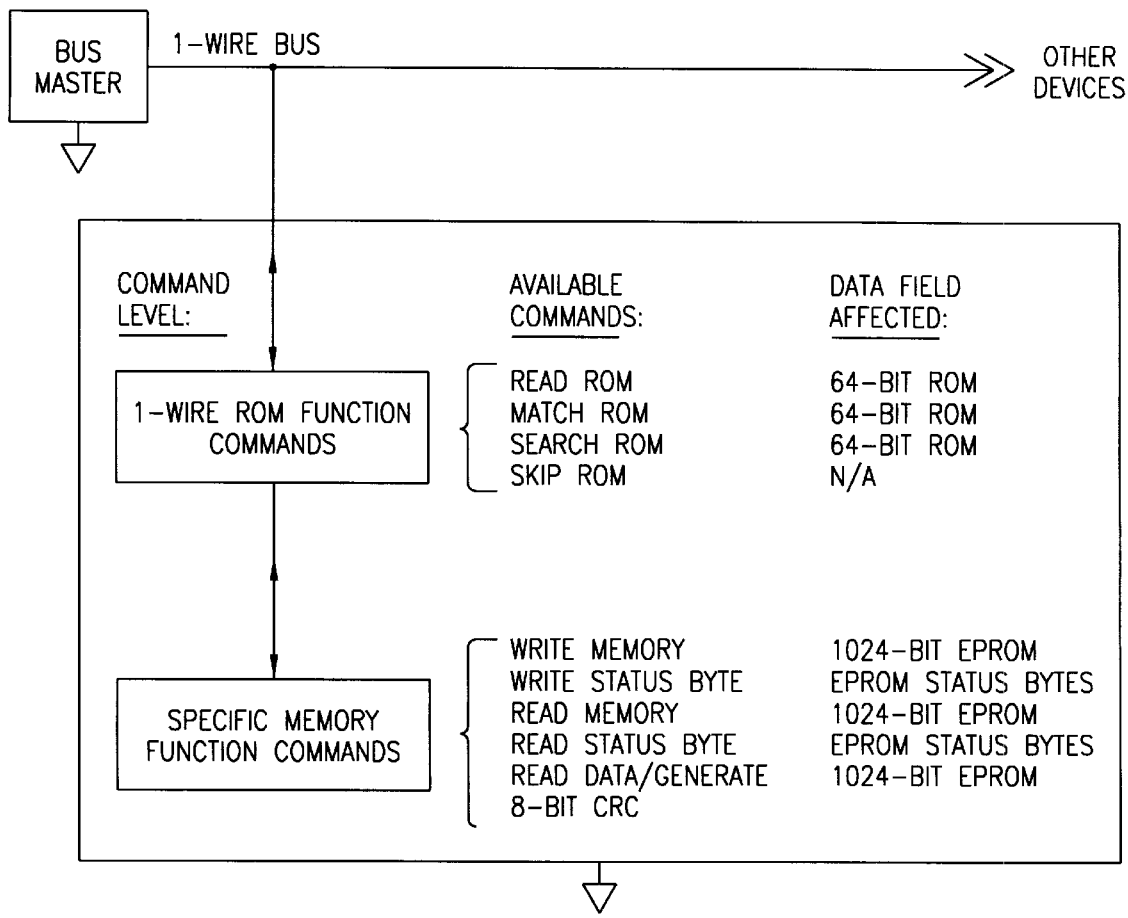
FIG. 1B is an outline showing the hierarchical structure for 1-Wire™ protocol.
Figure 1C:
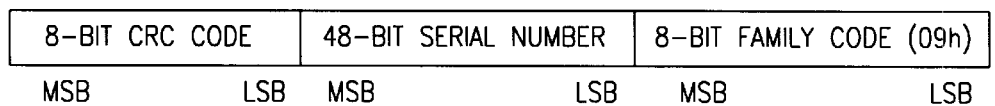
FIG. 1G is a memory map of the 64-Bit Lasered ROM 16 (in FIG. 1A)
FIG. 1H is state diagram of 1-Wire™ CRC Generator 22 (in FIG. 1A)
FIG. 1I is a memory map showing the 1024-bit EPROM section of preferred system embodiments that are configured as four pages of 32 bytes each.
FIGS. 1L-1 and 1L-2 depict a series of timing diagrams showing, inter alia, the definitions of read/Write Time Slots.
FIG. 1M is a timing diagram showing the application of a programming voltage.
FIG. 1N is a timing diagram showing the initialization sequence required to begin any communication with the preferred system embodiments.

The hierarchical structure of the 1-Wire™ protocol is shown in FIG. 1B. The bus master must first provide one of the four ROM Function Commands, 1) Read ROM, 2) Match ROM, 3) Search ROM, 4) Skip ROM. These commands operate on the 64-bit lasered ROM portion of each device and can singulate a specific device if many are present on the 1-Wire™ line as well as indicate to the bus master how many and what types of devices are present. After a ROM Function Command is successfully executed, the memory functions that operate on the EPROM portions of the preferred system embodiment become accessible and the bus master may issue any one of the five Memory Function Commands specific to the preferred system embodiment to read or program the various data fields. All data is read and written least significant bit first.

Regarding the 64-bit lasered ROM, each preferred system embodiment contains a unique ROM code that is 64 bits long. The first eight bits are a 1-Wire™ family code. The next 48 bits are a unique serial number. Referring to FIG. 1G, the last eight bits are a CRC of the first 56 bits. The 64-bit ROM and ROM Function Control section allow preferred system embodiments to operate as a 1-Wire™ device and follow the 1-Wire™ protocol detailed below. The memory functions required to read and program the EPROM sections of preferred system embodiments are not accessible until the ROM function protocol has been satisfied. The 1-Wire™ bus master must first provide one of four ROM function commands; 1) Read ROM, 2) Match ROM, 3) Search ROM, or 4) Skip ROM. After a ROM function sequence has been successfully executed, the bus master may then provide any one of the memory function commands specific to preferred system embodiments.

Figure 1H:
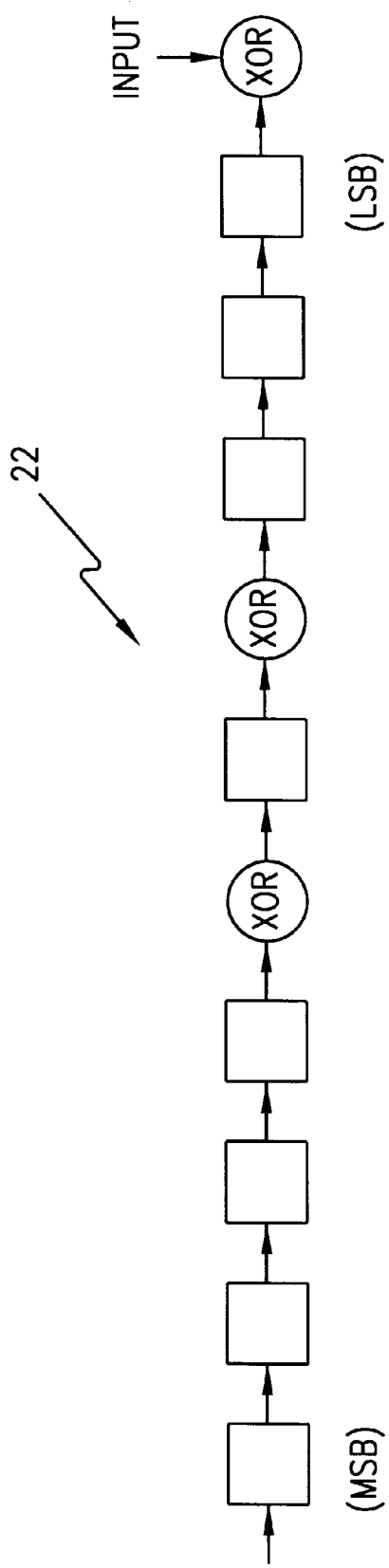

The 1-Wire™ CRC of the lasered ROM is generated using the polynomial $X^8+X^5+X^4+1$ (see FIG. 1H). Additional information about the Dallas Semiconductor 1-Wire™ Cycle Redundancy Check is available in the Book of DS19xx Touch Memory Standards, which is incorporated by reference hereinabove and in several of the patents and patent applications incorporated by reference. The shift register acting as the CRC accumulator is initialized to zero. Then starting with the least significant bit of the family code, one bit at a time is shifted in. After the eighth bit of the family code has been entered, then the serial number is entered. After the 48th bit of the serial number has been entered, the shift register contains the CRC value. Shifting in the eight bits of CRC should return the shift register to all zeroes.

Figure 1I:
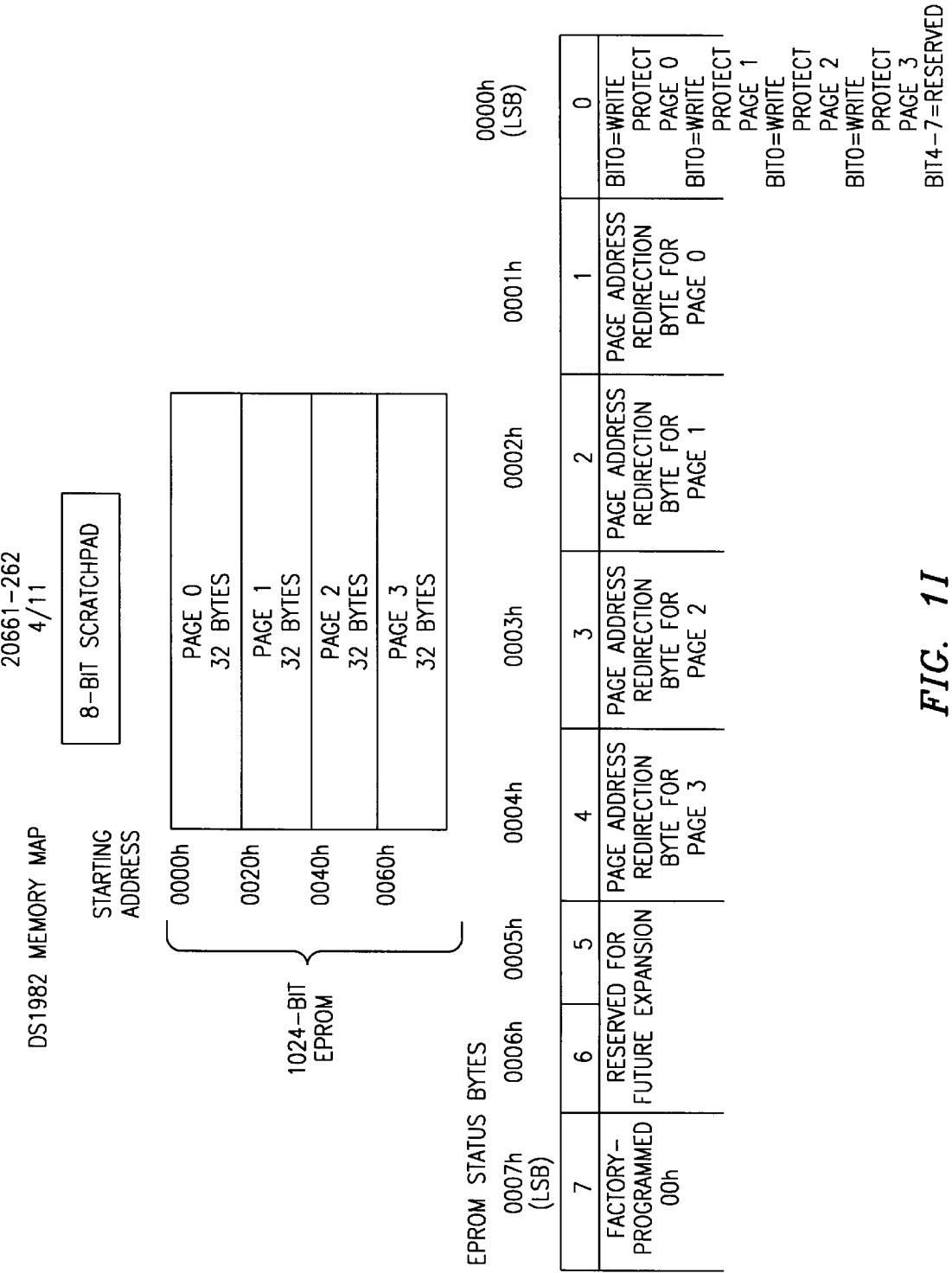

Regarding the 1024-BIT EPROM module 12 (in FIG. 1A), the memory map in FIG. 1I shows the 1024-bit EPROM section of the preferred system embodiment which is configured as four pages of 32 bytes each. The 8-bit scratchpad is an additional register that acts as a buffer when programming the memory. Data is first written to the scratchpad and then verified by reading an 8-bit CRC from preferred system embodiments that confirms proper receipt of the data. If the buffer contents are correct, a programming voltage should be applied and the byte of data will be written into the selected address in memory. This process insures data integrity when programming the memory. The details for reading and programming the 1024-bit EPROM portion of preferred system embodiments are given in the Memory Function Commands section.

Regarding EPROM Status Bytes, in addition to the 1024 bits of data memory the preferred system embodiments provides 64 bits of Status Memory accessible with separate commands.

The EPROM Status Bytes can be read or programmed to indicate various conditions to the software interrogating preferred system embodiments. The first byte of the EPROM Status Memory contains the Write Protect Page bits which inhibit programming of the corresponding page in the 1024-bit main memory area if the appropriate write protection bit is programmed. Once a bit has been programmed in the Write Protect Page byte, the entire 32 byte page that corresponds to that bit can no longer be altered but may still be read.

The next four bytes of the EPROM Status Memory contain the Page Address Redirection Bytes which indicate if one or more of the pages of data in the 1024-bit EPROM section have been invalidated and redirected to the page address contained in the appropriate redirection byte. The hardware of the preferred system embodiment makes no decisions based on the contents of the Page Address Redirection Bytes. These additional bytes of Status EPROM allow for the redirection of an entire page to another page address, indicating that the data in the original page is no longer considered relevant or valid. With EPROM technology, bits within a page can be changed from a logical 1 to a logical 0 by programming, but cannot be changed back. Therefore, it is not possible to simply rewrite a page if the data requires changing or updating, but with space permitting, an entire page of data can be redirected to another page within preferred system embodiments by writing the one's complement of the new page address into the Page Address Redirection Byte that corresponds to the original (replaced) page.

This architecture allows the user's software to make a "data patch" to the EPROM by indicating that a particular page or pages should be replaced with those indicated in the Page Address Redirection Bytes.

If a Page Address Redirection Byte has a FFH value, the data in the main memory that corresponds to that page is valid. If a Page Address Redirection Byte has some other hex value, the data in the page corresponding to that redirection byte is invalid, and the valid data can now be found at the one's complement of the page address indicated by the hex value stored in the associated Page Address Redirection Byte. A value of FDH in the redirection byte for page 1, for example, would indicate that the updated data is now in page 2. The details for reading and programming the EPROM status memories portion of preferred system embodiments is given in the Memory Function Commands section. The Memory Function Control section, 8-bit scratchpad, and the Program Voltage Detect circuit combine to interpret the commands issued by the bus master and create the correct control signals within the device. A three-byte protocol is issued by the bus master. It is comprised of a command byte to determine the type of operation and two address bytes to determine the specific starting byte location within a data field. The command byte indicates if the device is to be read or written. Writing data involves not only issuing the correct command sequence but also providing a 12 volt programming voltage at the appropriate times. To execute a write sequence, a byte of data is first loaded into the scratchpad and then programmed into the selected address. Write sequences always occur a byte at a time. To execute a read sequence, the starting address is issued by the bus master and data is read from the part beginning at that initial location and continuing to the end of the selected data field or until a reset sequence is issued. All bits transferred to preferred system embodiments and received back by the bus master are sent least significant bit first.

Regarding READ MEMORY [F0H], the Read Memory command is used to read data from the 1024-bit EPROM data field. The bus master follows the command byte with a two byte address (TA1=(T7:T0), TA2=(T15:T8)) that indicates a starting byte location within the data field. An 8-bit CRC of the command byte and address bytes is computed by the preferred system embodiments and read back by the bus master to confirm that the correct command word and starting address were received. If the CRC read by the bus master is incorrect, a Reset Pulse must be issued and the entire sequence must be repeated. If the CRC received by the bus master is correct, the bus master issues read time slots and receives data from preferred system embodiments starting at the initial address and continuing until the end of the 1024-bit data field is reached or until a Reset Pulse is issued. If reading occurs through the end of memory space, the bus master may issue eight additional read time slots and preferred system embodiments will respond with an 8-bit CRC of all data bytes read from the initial starting byte through the last byte of memory. After the CRC is received by the bus master, any subsequent read time slots will appear as logical 1s until a Reset Pulse is issued. Any reads ended by a Reset Pulse prior to reaching the end of the memory will not have the 8-bit CRC available.

Typically a 16-bit CRC would be stored with each page of data to insure rapid, error-free transfers that eliminate having to read a page multiple times to determine if the received data is correct or not. (See Book of DS19xx Touch Memory Standards, Chapter 7 for the recommended file structure to be used with the 1-Wire™ environment.) If CRC values are imbedded within the data, a Reset Pulse may be issued at the end of memory space during a Read Memory command.

Regarding READ STATUS [AAH], the Read Status command is used to read data from the EPROM Status data field. The bus master follows the command byte with a two byte address (TA1=(T7:T0), TA2=(T15:T8)) that indicates a starting byte location within the data field. An 8-bit CRC of the command byte and address bytes is computed by preferred system embodiments (as shown in FIG. 1H) and readback by the bus master to confirm that the correct command word and starting address were received. If the CRC read by the bus master is incorrect, a Reset Pulse must be issued and the entire sequence must be repeated. If the CRC received by the bus master is correct, the bus master issues read time slots and receives data from the preferred system embodiments starting at the supplied address and continuing until the end of the EPROM Status data field is reached. At that point the bus master will receive an 8-bit CRC that is the result of shifting into the CRC generator all of the data bytes from the initial starting byte through the final factory-programmed byte that contains the 00h value.

This feature is provided since the EPROM Status information may change over time making it impossible to program the data once and include an accompanying CRC that will always be valid. Therefore, the Read Status command supplies an 8-bit CRC that is based on and always is consistent with the current data stored in the EPROM Status data field.

After the 8-bit CRC is read, the bus master will receive logical 1s from the preferred system embodiments until a Reset Pulse is issued. The Read Status command sequence can be exited at any point by issuing a Reset Pulse.

Regarding the READ DATA/GENERATE 8-BIT CRC [C3H], the Read Data/Generate 8-bit CRC command is used to read data from the 1024-bit EPROM memory field. The bus master follows the command byte with a two byte address (TA1=(T7:T0), TA2=(T15:T8)) that indicates a starting byte location within the data field. An 8-bit CRC of the command byte and address bytes is computed by the preferred system embodiments and read back by the bus master to confirm that the correct command word and starting address were received. If the CRC read by the bus master is incorrect, a Reset Pulse must be issued and the entire sequence must be repeated. If the CRC received by the bus master is correct, the bus master issues read time slots and receives data from the preferred system embodiments starting at the initial address and continuing until the end of a 32-byte page is reached. At that point the bus master will send eight additional read time slots and receive an 8-bit CRC that is the result of shifting into the CRC generator all of the data bytes from the initial starting byte to the last byte of the current page. Once the 8-bit CRC has been received, data is again read from the 1024-bit EPROM 12 data field starting at the next page. This sequence will continue until the final page and its accompanying CRC are read by the bus master. Thus each page of data can be considered to be 33 bytes long, the 32 bytes of user-programmed EPROM data and an 8-bit CRC that gets generated automatically at the end of each page.

This type of read differs from the Read Memory command which simply reads each page until the end of address space is reached. The Read Memory command only generates an 8-bit CRC at the end of memory space that often might be ignored, since in many applications the user would store a 16-bit CRC with the data itself in each page of the 1024-bit EPROM 12 data field at the time the page was programmed.

The Read Data/Generate 8-bit CRC command provides an alternate read capacity for applications that are "bit-oriented" rather than "page-oriented" where the 1024-bit EPROM 12 information may change over time within a page boundary making it impossible to program the page once and include an accompanying CRC that will always be valid. Therefore, the Read Data/Generate 8-Bit CRC command concludes each page with the preferred system embodiments generating and supplying an 8-bit CRC that is based on and therefore is always consistent with the current data stored in each page of the 1024-bit EPROM 12 data field. After the 8-bit CRC of the last page is read, the bus master will receive logical 1s from the preferred system embodiments until a Reset Pulse is issued. The Read Data/Generate 8-Bit CRC command sequence can be exited at any point by issuing a Reset Pulse.

Regarding the WRITE MEMORY [0FH] command, the Write Memory command is used to program the 1024-bit EPROM data field. The bus master will follow the command byte with a two byte starting address (TA1=(T7:T0), TA2=(T15:T8)) and a byte of data (D7:D0). An 8-bit CRC of the command byte, address bytes, and data byte is computed by the preferred system embodiments and read back by the bus master to confirm that the correct command word, starting address, and data byte were received.

If the CRC read by the bus master is incorrect, a Reset Pulse must be issued and the entire sequence must be repeated. If the CRC received by the bus master is correct, a programming pulse (12 volts on the 1-Wire™ bus for 480 us) is issued by the bus master. Prior to programming, the entire unprogrammed 1024-bit EPROM data field will appear as logical 1s. For each bit in the data byte provided by the bus master that is set to a logical 0, the corresponding bit in the selected byte of the 1024-bit EPROM 12 will be programmed to a logical 0 after the programming pulse has been applied at the byte location.

After the 480 us programming pulse is applied and the data line returns to a 5 volt level, the bus master issues eight read time slots to verify that the appropriate bits have been programmed. The preferred system embodiments responds with the data from the selected EPROM address sent least significant bit first. This byte contains the logical AND of all bytes written to this EPROM data address. If the EPROM data byte contains 1s in bit positions where the byte issued by the master contains 0s, a Reset Pulse should be issued and the current byte address should be programmed again. If the preferred system embodiments EPROM data byte contains 0s in the same bit position as the data byte, the programming was successful and the preferred system embodiments will automatically increment its address counter to select the next byte in the 1024-bit EPROM 12 data field. The least significant byte of the new two-byte address will also be loaded into the 8-bit CRC generator as a starting value. The bus master will issue the next byte of data using eight write time slots.

As the preferred system embodiments receives this byte of data into the scratchpad, it also shifts the data into the CRC generator that has been preloaded with the LSB of the current address and the result is an 8-bit CRC of the new data byte and the LSB of the new address. After supplying the data byte, the bus master will read this 8-bit CRC from the preferred system embodiments with eight read time slots to confirm that the address incremented properly and the data byte was received correctly. If the CRC is correct, the bus master will issue a programming pulse and the selected byte in memory will be programmed.

Note that the initial pass through the Write Memory flow chart will generate an 8-bit CRC value that is the result of shifting the command byte into the CRC generator, followed by the two address bytes, and finally the data byte. Subsequent passes through the Write Memory flow chart due to the preferred system embodiments automatically incrementing its address counter will generate an 8-bit CRC that is the result of loading (not shifting) the LSB of the new (incremented) address into the CRC generator and then shifting in the new data byte.

For both of these cases, the decision to continue (to apply a program pulse to the preferred system embodiments) is made entirely by the bus master, since the preferred system embodiments will not be able to determine if the 8-bit CRC calculated by the bus master agrees with the 8-bit CRC calculated by the preferred system embodiments. If an incorrect CRC is ignored and a program pulse is applied by the bus master, incorrect programming could occur within the preferred system embodiments. Also note that the preferred system embodiments will always increment its internal address counter after the receipt of the eight read time slots used to confirm the programming of the selected EPROM byte. The decision to continue is again made entirely by the bus master, therefore if the EPROM data byte does not match the supplied data byte but the master continues with the Write Memory command, incorrect programming could occur within the preferred system embodiments. The Write Memory command sequence can be exited at any point by issuing a Reset Pulse.

Regarding WRITE STATUS [55H], the Write Status command is used to program the EPROM Status data field. The bus master will follow the command byte with a two byte starting address (TA1=(T7:T0), TA2=(T15:T8)) and a byte of status data (D7:D0). An 8-bit CRC of the command byte, address bytes, and data byte is computed by the preferred system embodiments and read back by the bus master to confirm that the correct command word, starting address, and data byte were received.

If the CRC read by the bus master is incorrect, a Reset Pulse must be issued and the entire sequence must be repeated. If the CRC received by the bus master is correct, a programming pulse (12 volts on the 1-Wire™ bus for 480 us) is issued by the bus master. Prior to programming, the first seven bytes of the EPROM Status 14 data field will appear as logical 1s. For each bit in the data byte provided by the bus master that is set to a logical 0, the corresponding bit in the selected byte of the EPROM STATUS BYTE data field will be programmed to a logical 0 after the programming pulse has been applied at that byte location. The eighth byte of the EPROM Status Byte data field is factory-programmed to contain 00h.

After the 480 us programming pulse is applied and the data line returns to a 5 volt level, the bus master issues eight read time slots to verify that the appropriate bits have been programmed. The preferred system embodiments responds with the data from the selected EPROM Status address sent least significant bit first. This byte contains the logical AND of all bytes written to this EPROM Status Byte address. If the EPROM Status Byte contains 1s in bit positions where the byte issued by the master contained 0s, a Reset Pulse should be issued and the current byte address should be programmed again. If the preferred system embodiments EPROM Status Byte contains 0s in the same bit positions as the data byte, the programming was successful and the preferred system embodiments will automatically increment its address counter to select the next byte in the EPROM Status data field. The least significant byte of the new two-byte address will also be loaded into the 8-bit CRC generator as a starting value. The bus master will issue the next byte of the data using eight write time slots.

As the preferred system embodiments receives this byte of data into the scratchpad, it also shifts the data into the CRC generator that has been preloaded with the LSB of the current address and the result is an 8-bit CRC of the new data byte and the LSB of the new address. After supplying the data byte, the bus master will read this 8-bit CRC from the preferred system embodiments with eight read time slots to confirm that the address incremented properly and the data byte was received correctly. If the CRC is incorrect, a Reset Pulse must be issued and the Write Status command sequence must be restarted. If the CRC is correct, the bus master will issue a programming pulse and the selected byte in memory will be programmed.

Note that the initial pass through the Write Status flow chart will generate an 8-bit CRC value that is the result of shifting the command byte into the CRC generator, followed by the two address bytes, and finally the data byte. Subsequent passes through the Write Status flow chart due to the preferred system embodiments automatically incrementing its address counter will generate an 8-bit CRC that is the result of loading (not shifting) the LSB of the new (incremented) address into the CRC generator and then shifting in the new data byte.

For both of these cases, the decision to continue (to apply a program pulse to the preferred system embodiments) is made entirely by the bus master, since the preferred system embodiments will not be able to determine if the 8-bit CRC calculated by the bus master agrees with the 8-bit CRC calculated by the preferred system embodiments. If an incorrect CRC is ignored and a program pulse is applied by the bus master, incorrect programming could occur within the preferred system embodiments. Also note that the preferred system embodiments will always increment its internal address counter after the receipt of the eight read time slots used to confirm the programming of the selected EPROM byte. The decision to continue is again made entirely by the bus master, therefore if the EPROM data byte does not match the supplied data byte but the master continues with the Write Status command, incorrect programming could occur within the preferred system embodiments. The Write Status command sequence can be ended at any point by issuing a Reset Pulse.

Regarding the 1-Wire™ bus system 18, the 1-Wire™ bus 18 is a system which has a single bus master and one or more slaves. In all instances, the preferred system embodiments is a slave device. The bus master is typically a microcontroller. The discussion of this bus system is broken down into three topics; hardware configuration, transaction sequence, and 1-Wire™ signalling (signal type and timing). A 1-Wire™ protocol defines bus transactions in terms of the bus state during specified time slots that are initiated on the falling edge of sync pulses from the bus master. For a more detailed protocol description, refer to Chapter 4 of the Book of DS19xx Touch Memory Standards.

Regarding the preferred hardware configuration, the 1-Wire™ bus 18 has only a single line by definition; it is important that each device on the bus be able to drive it at the appropriate time. To facilitate this, each device attached to the 1-Wire™ bus must have an open drain connection or 3-state outputs. The bus master 26 can be the same equivalent circuit. If a bidirectional pin is not available, separate output and input pins can be tied together.

The bus master 26 requires a pull-up resistor at the master end of the bus, with the bus master 26 circuit equivalent to the one shown in FIG. 1K. The value of the pull-up resistor should be approximately 5 kohms for short line lengths.

A multidrop bus consists of a 1-Wire™ bus with multiple slaves attached. The 1-Wire™ bus 18 (in FIG. 1A) has a maximum data rate of 16.3k bits per second. If the bus master 26 is also required to perform programming of the EPROM portions of the preferred system embodiments, a programming supply capable of delivering up to 10 milliamps at 12 volts for 480 us is required. The idle state for the 1-Wire™ bus is high. If, for any reason, a transaction needs to be suspended, the bus MUST be left in the idle state if the transaction is to resume. If this does not occur and the bus is left low for more than 120 us, one or more of the devices on the bus may be reset.

Regarding the transaction sequence, the sequence for accessing the preferred system embodiments via the 1-Wire™ port is as follows: Initialization, ROM Function Command, Memory Function Command, and Read/Write Memory/Status.

Regarding initialization, all transactions on the 1-Wire™ bus begin with an initialization sequence. The initialization sequence consists of a reset pulse transmitted by the bus master 26 followed by a presence pulse(s) transmitted by the slave(s).

The presence pulse lets the bus master 26 know that the preferred system embodiment is on the bus and is ready to operate. For more details, see the description below regarding "1-Wire™ Signalling."

Regarding ROM FUNCTION COMMANDS, once the bus master 26 has detected a presence, it can issue one of the four ROM function commands. All ROM function commands are eight bits long.

Regarding Read ROM [33H], this command allows the bus master 26 to read the preferred system embodiment's 8-bit family code, unique 48-bit serial number, and 8-bit CRC. This command can be used only if there is a single preferred system embodiment on the bus. If more than one slave is present on the bus, a data collision will occur when all slaves try to transmit at the same time (open drain will produce a wired-AND result).

Regarding Match ROM [55H], the match ROM command, followed by a 64-bit ROM sequence, allows the bus master 26 to address a specific preferred system embodiment on a multidrop bus. Only the preferred system embodiment that exactly matches the 64-bit ROM sequence will respond to the subsequent memory function command. All slaves that do not match the 64-bit ROM sequence will wait for a reset pulse. This command can be used with a single or multiple devices on the bus.

Regarding Skip ROM [CCH], this command can save time in a single drop bus system by allowing the bus master 26 to access the memory functions without providing the 64-bit ROM code. If more than one slave is present on the bus and a read command is issued following the Skip ROM command, data collision will occur on the bus as multiple slaves transmit simultaneously (open drain pull-downs will produce a wire-AND result).

Regarding Search ROM [F0H], when a system is initially brought up, the bus master 26 might not know the number of devices on the 1-Wire™ bus or their 64-bit ROM codes. The search ROM command allows the bus master 26 to use a process of elimination to identify the 64-bit ROM codes of all slave devices on the bus. The ROM search process is the repetition of a simple 3-step routine: read a bit, read the complement of the bit, then write the desired value of that bit. The bus master 26 performs this simple, 3-step routine on each bit of the ROM. After one complete pass, the bus master 26 knows the contents of the ROM in one device. The remaining number of devices and their ROM codes may be identified by additional passes. See Chapter 5 for a comprehensive discussion of a ROM search, including an actual example.

Regarding 1-Wire™ Signalling, the preferred system embodiment requires strict protocols to insure data integrity. The protocol consists of five types of signalling on one line: Reset Sequence with Reset Pulse and Presence Pulse, Write 0, Write 1, Read Data and Program Pulse. All these signals except presence pulse are initiated by the bus master 26. The initialization sequence required to begin any communication with the preferred system embodiments is shown in FIG. 1N. A reset pulse followed by a presence pulse indicates the preferred system embodiments is ready to accept a ROM command. The bus master 26 transmits (TX) a reset pulse (tPDH, 15–60 us) and then transmits the present pulse (tPDL, 60–240 us).

Figures 1, 1L, 2:
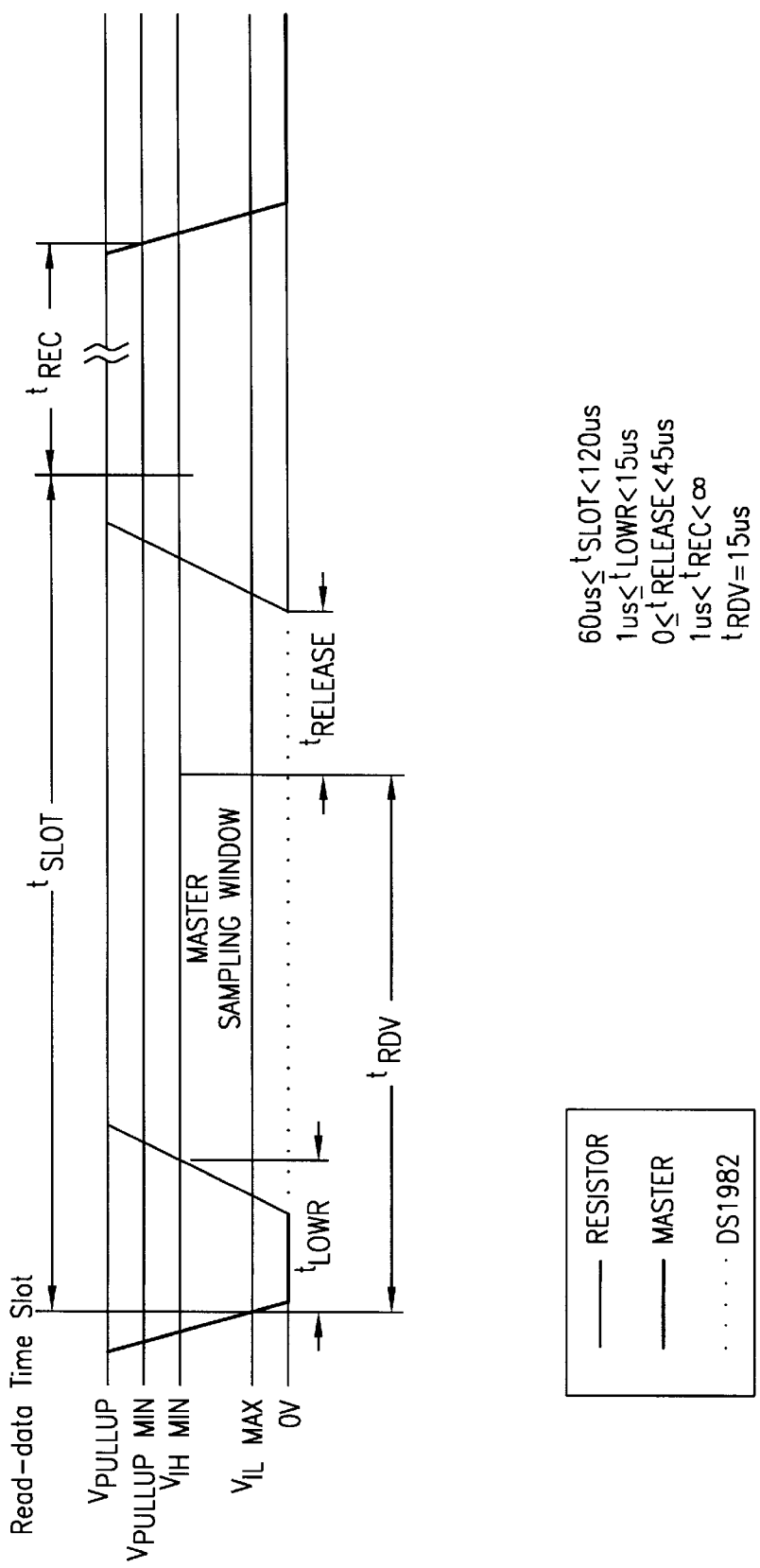

Regarding Read/Write Time Slots, the definitions of write and read time slots are illustrated in FIGS. 1L-1 and 1L-2. All time slots are initiated by the master driving the data line low. The falling edge of the data line synchronizes the preferred system embodiments to the master by triggering a delay circuit in the preferred system embodiments. During write time slots, the delay circuit determines when the preferred system embodiments will sample the data line. For a read data time slot, if a "0" is to be transmitted, the delay circuit determines how long the preferred system embodiments will hold the data line low overriding the 1 generated by the master. If the data bit is a "1," the preferred system embodiments will leave the read data time slot unchanged.

Figure 1M:
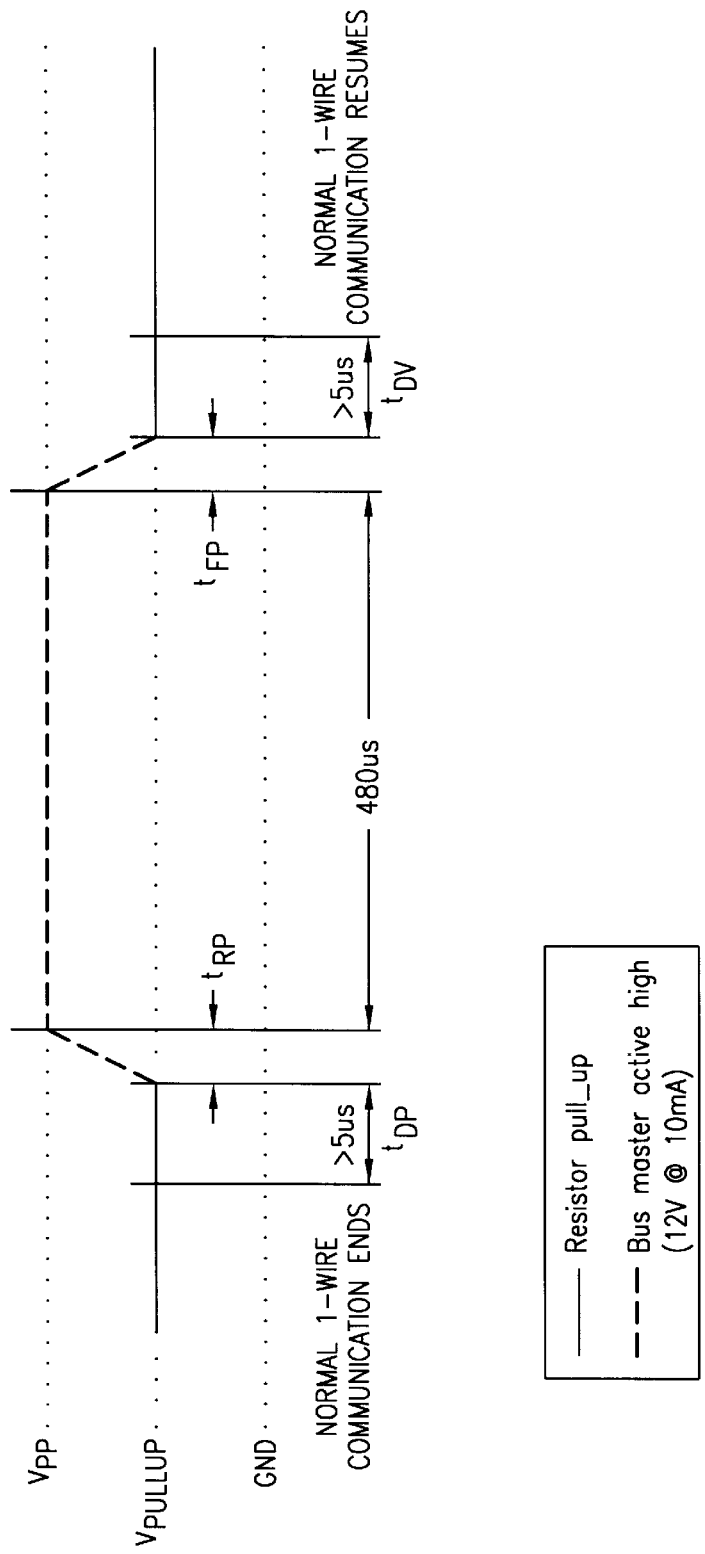
Figure 1N:
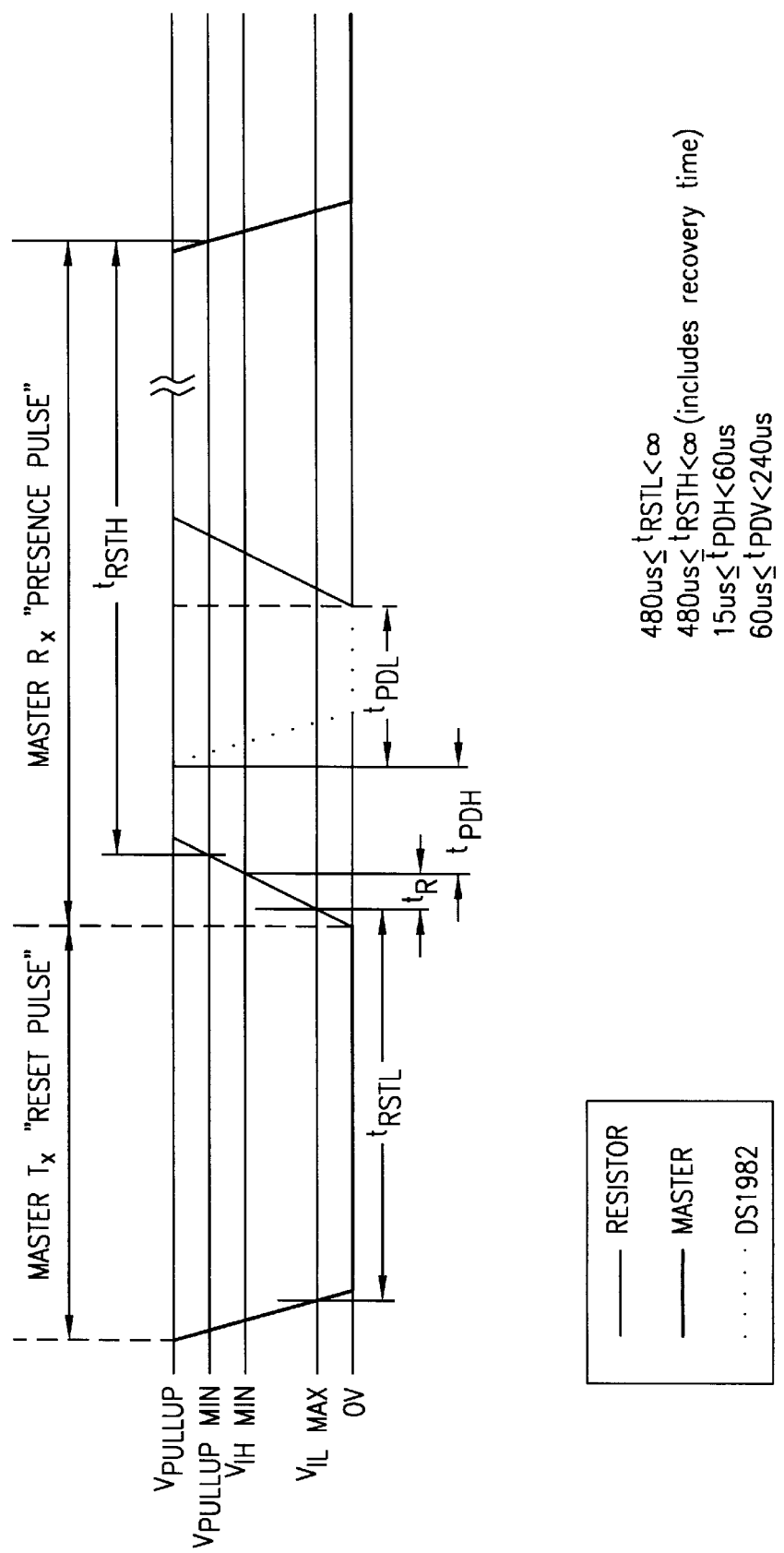
Figure 2A:
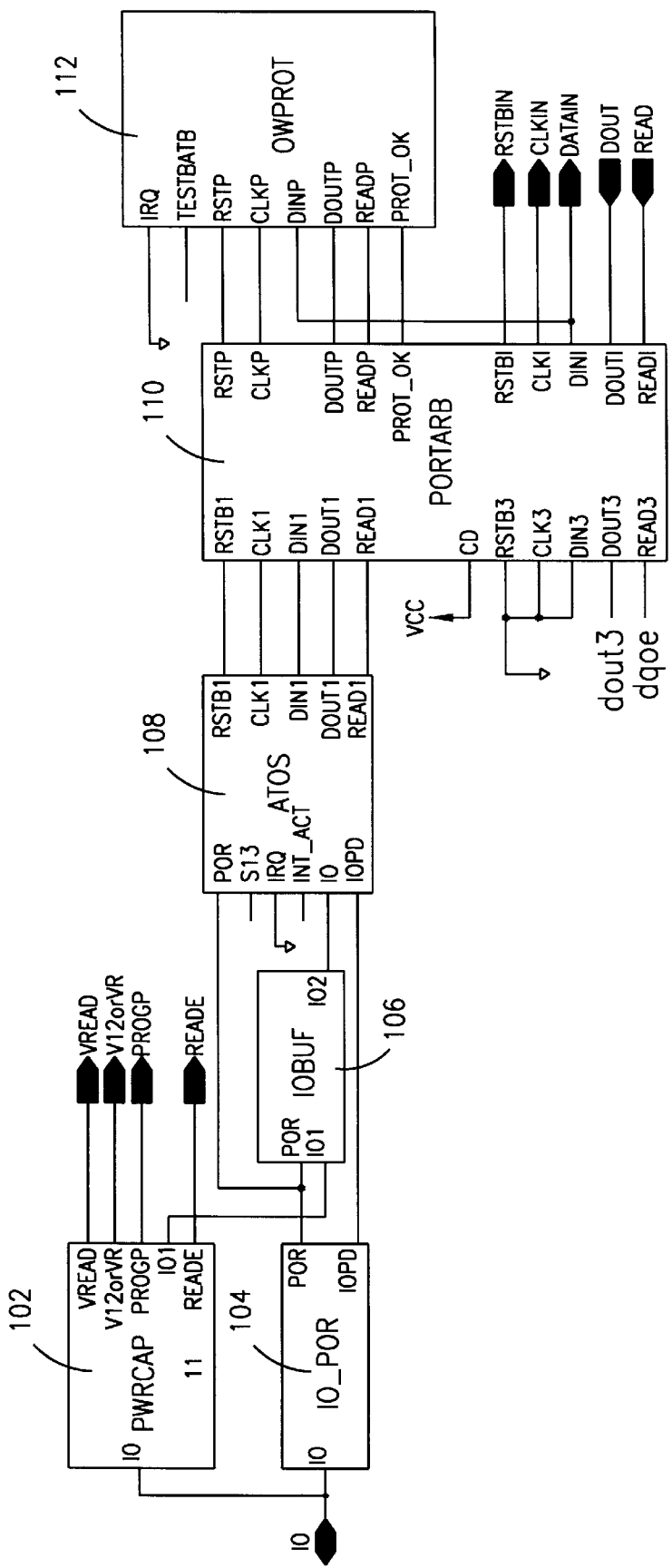
FIG. 2A is a block diagram showing the architecture of a preferred embodiment of input/output module 100 which generally comprises PWRCAP module 102, IO_POR module 104, IOBUF module 106, ATOS module 108, PORTARB module 110, and OWPROT module 112 coupled together.

Regarding the program pulse, to copy data from the 8-bit scratchpad to the EPROM Data or Status Memory, a program pulse of 12 volts is applied to the data line after the bus master 26 has confirmed that the CRC for the current byte is correct. During programming, the bus master 26 controls the transition from a state where the data line is idling high via the pull-up resistor to a state where the data line is actively driven to a programming voltage of 12 volts providing a minimum of 10 mA of current to the preferred system embodiments. This programming voltage (FIG. 1M) should be applied for 480 us, after which the bus master 26 returns the data line to an idle high state controlled by the pull-up resistor. Note that due to high voltage programming requirements for any 1-Wire™ EPROM device, it is not possible to multi-drop non-EPROM based 1-Wire™ devices with the preferred system embodiments during programming. An internal diode within the non-EPROM based 1-Wire™ devices will attempt to clamp the data line at approximately 8 volts and could potentially damage these devices.

Regarding CRC GENERATION, preferred system embodiments have an 8-bit CRC in the most significant byte of the 64-bit ROM. The bus master 26 can compute a CRC value from the first 56 bits of the 64-bit ROM and compare it to the value stored within the preferred system embodiments to determine if the ROM data has been received error-free by the bus master 26. The equivalent polynomial function of this CRC is: $X^8+X^5+X^4+1$.

Under certain conditions, the preferred system embodiments also generate an 8-bit CRC value using the same polynomial function shown above and provides this value to the bus master 26 to validate the transfer of command, address, and data bytes from the bus master 26 to the preferred system embodiments. The preferred system embodiments compute an 8-bit CRC for the command, address, and data bytes received for the Write Memory and the Write Status commands and then output this value to the bus master 26 to confirm proper transfer. Similarly the preferred system embodiments compute an 8-bit CRC for the command and address bytes received from the bus master 26 for the Read Memory, Read Status, and Read Data/Generate 8-Bit CRC commands to confirm that these bytes have been received correctly. The CRC generator on the preferred system embodiments is also used to provide verification of error-free data transfer as each page of data from the 1024-bit EPROM is sent to the bus master 26 during a Read Data/Generate 8-Bit CRC command, and for the eight bytes of information in the status memory field.

In each case where a CRC is used for data transfer validation, the bus master 26 must calculate a CRC value using the polynomial function given above and compare the calculated value to either the 8-bit CRC value stored in the 64-bit ROM portion of the preferred system embodiments (for ROM reads) or the 8-bit CRC value computed within the preferred system embodiments. The comparison of CRC values and decision to continue with an operation are determined entirely by the bus master 26. There is no circuitry on the preferred system embodiments that prevents a command sequence from proceeding if the CRC stored in or calculated by the preferred system embodiments does not match the value generated by the bus master 26. Proper use of the CRC in accordance with the present invention can result in a communication channel with a very high level of integrity. For more details on generating CRC values including example implementations in both hardware and software, see the Book of DS19xx Touch Memory Standards.

Figure 5A:
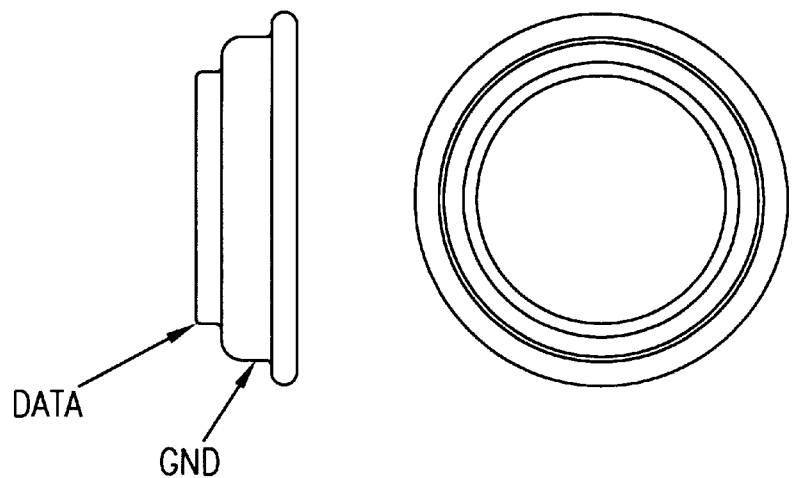
FIGS. 5A and 5B show preferred conductive modules in which the apparatus according to the present invention is placed.
Figure 5B:
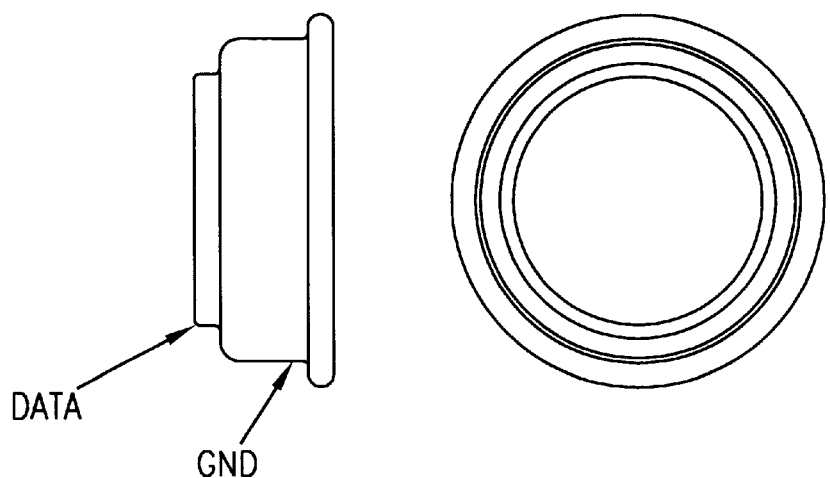
Figure 6B:
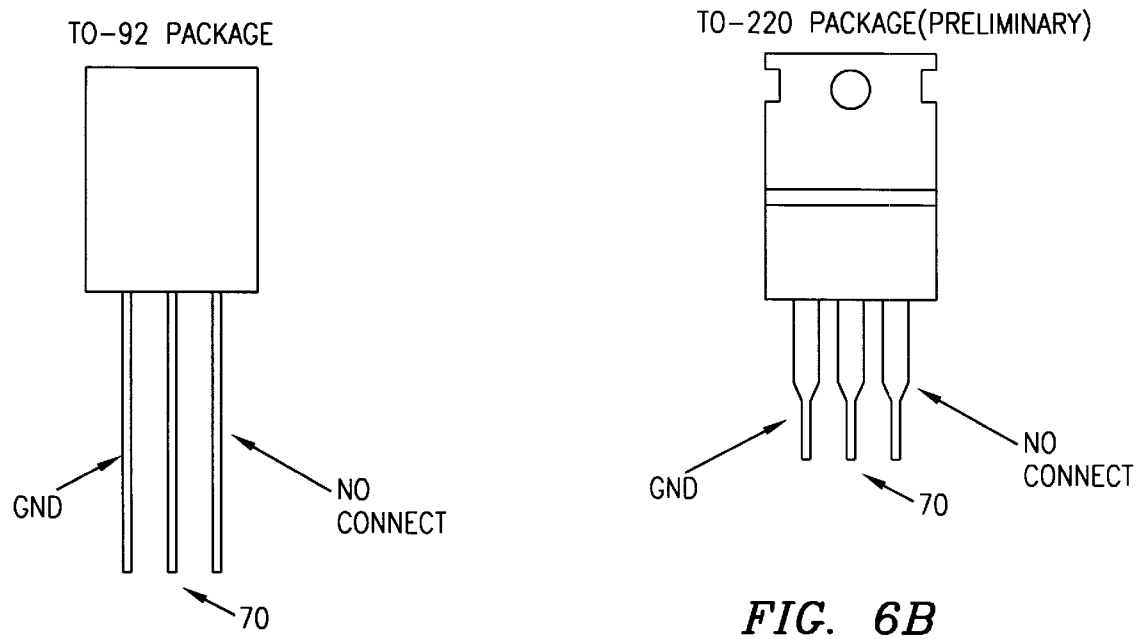
FIGS. 6A and 6B show alternate preferred packages that house the circuitry shown and described above.
Figure 6A:
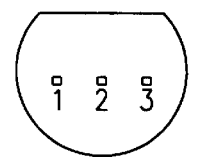

FIGS. 5A and 5B show preferred conductive modules in which the circuitry shown and described above is placed. Alternate packages are shown in FIGS. 6A and 6B.

FURTHER MODIFICATIONS AND VARIATIONS

Although the invention has been described with reference to a specific embodiment, this description is not meant to be construed in a limiting sense. In particular, novel aspects of the inventions described above and shown in the drawings may stand alone and/or be selectively combined in an overall system. In other words, while preferred embodiments may incorporate most or all of the features described above, alternate preferred embodiments may only incorporate a selected number of the features, depending upon the application. As described above, various modifications of the disclosed embodiment as well as alternate embodiments of the invention will become apparent to persons skilled in the art upon reference to the description of the invention. For instance, additional conductive surfaces (beyond the first and second conductive surfaces/contacts disclosed) could be added to provide additional electrical contacts housed therein. Naturally, it is preferred that the additional surfaces would be insulated from one another. Accordingly, it should be understood that the modifications and variations suggested above and below are not intended to be exhaustive. These examples help show the scope of the inventive concepts, which are covered in the appended claims. The appended claims are intended to cover these modifications and alternate embodiments as well as a host of applications of this technology. In particular, permanent ID records, maintenance or warranty information, calibration or baseline set-up data, monetary equivalent, event attendance monitoring, etc. In addition, please note that while preferred systems employ electrically programmable read only memory, other forms of electrically programmable memory can be used as well. For instance, $E^2PROM$ can be used as well. Moreover, please note that while inventions described above are discussed in conjunction with one another, alternate embodiments may only incorporate some of the preferred features and innovations or different combinations of preferred features and innovations described above without departing from the spirit and scope of the inventions claimed below. Similarly, while preferred embodiments are packaged in substantially token-shaped modules described and shown above, alternate embodiments can be packaged in structures shown in some of the packages shown in the references incorporated by reference that may have two or more conductive surfaces.

We claim:

1. An apparatus comprising:
   a circuit disposed in a housing, said housing having a cavity and formed from two substantially concave, electrically conductive surfaces with an insulating member disposed therebetween, said circuit comprising
   an input/output module, said input/output module further comprising a parasitic power sub-module;
   a scratchpad memory, coupled to said input/output module;
   a programmable memory, coupled to said scratchpad memory; and
   a control module, said control module coupled to said input/output module, said scratchpad memory and said programmable memory.

2. The apparatus of claim 1, wherein said control module further comprises:
   verification means for verifying at least one of a data and an address.

3. The apparatus of claim 1, wherein said control module transfers a data block between said scratchpad memory and said programmable memory in response to a data block transfer command received by said input/output module.

4. The apparatus of claim 1, wherein said programmable memory comprises a plurality of memory blocks, each of said plurality of memory blocks being coupled to said scratchpad memory and said control module.

5. The apparatus of claim 1, wherein said plurality of memory blocks comprises at least four memory blocks.

6. The apparatus of claim 1, wherein said circuit further comprising:
   accepting means to accept an intermittent voltage signal, applied between said two electrically conductive surfaces.

7. The apparatus of claim 1, wherein said parasitic power sub-module comprises:
   at least one capacitor for storing energy from an intermittent voltage signal, applied between said two electrically conductive surfaces.

8. The apparatus of claim 1, wherein said circuit further comprises:
   a voltage level detector coupled to said two electrically conductive surfaces, said voltage level detector detecting a voltage difference therebetween; and
   a switch, coupled to said two electrically conductive surfaces, said switch controlling transmission of a signal by changing a resistance therebetween.

9. The apparatus of claim 1, wherein said input/output module, said scratchpad memory, said programmable memory and said control module are integrated as a monolithic circuit.

10. The apparatus of claim 1, wherein said housing is mountable to at least one physical item, said physical item selected from the group consisting of maintenance records, retail products, inventory, work-in-progress, machinery, cards, identification badges and any combination thereof.

11. The apparatus of claim 1, wherein said input/output module, said scratchpad memory, said programmable memory and said control module are packaged in a low-height package.

12. The apparatus of claim 11, wherein said low-height package is selected from the group consisting of a flat pack, a small out-line integrated circuit and any combination thereof.

13. The apparatus of claim 1, wherein said input/output module, said scratchpad memory, said programmable memory and said control module are combined into an integrated circuit, said integrated circuit mounted on a printed circuit board.

14. The apparatus of claim 1, wherein said housing is button-shaped, being approximately 6 millimeters in diameter and approximately 3 millimeters in thickness.

15. The apparatus of claim 1, wherein said input/output module further comprises a serial port and a program port.

16. The apparatus of claim 1, wherein said programmable memory comprises at least 1024 bits.

17. The apparatus of claim 1, further comprising:
a bus master module coupled to said input/output module, whereby said bus master module controls data communication between an external host and said input/output module.

18. The apparatus of claim 17, wherein said bus master module holds a data line to a first voltage level for a first time period, creates a transition between said first voltage level and a second voltage level, holds the data line at said second voltage level for a second time period, and interrogates said data line at a sample time to determine a data value.

19. The apparatus of claim 18, wherein said first time period is at least one microsecond.

20. The apparatus of claim 18, wherein said first voltage level is approximately five volts and corresponds to a logic high signal.

21. The apparatus of claim 18, wherein said second voltage level is selected from a zero volt and ground, and wherein said selected voltage level corresponds to a logic low signal.

22. The apparatus of claim 18, wherein said transition provides a reference time for said control module to coordinate a plurality of operations.

23. The apparatus of claim 18, wherein said second time period is at least one microsecond.

24. The apparatus of claim 18, wherein said sample time is at least 30 microseconds from said transition.

25. The apparatus of claim 1, further comprising a voltage level detector, coupled to said two electrically conductive surfaces, said voltage level detector detecting a voltage difference, said voltage difference used for programming said programmable memory.

26. The apparatus of claim 1, wherein said programmable memory comprises at least one memory cell, said at least one memory cell further comprising at least one field effect transistor, said at least one field effect transistor being programmed by a programming voltage signal received by said input/output module.

27. The apparatus of claim 1, wherein said input/output module comprises a voltage switch, said voltage switch being capable of detecting a voltage difference received at said input/output module, said voltage switch taking an action in response to said voltage difference, said action being dependent upon at least one of a data verification and an address verification, said action further being one of reading a value from said programmable memory or programming a location in said programmable memory.

28. The apparatus of claim 1, wherein said programmable memory comprises:
a read only memory.

29. The apparatus of claim 1, wherein said scratchpad memory comprises at least 8 bits.

30. An apparatus comprising:
a housing; and
a circuit disposed in said housing, said housing including a cavity and formed from two substantially concave, electrically conductive surfaces with an insulating member disposed therebetween, said circuit comprising:
an input/output module, said input/output module further comprising at least a bus having one-wire, said input/output module further comprising a bus arbitrator and a parasitic power sub-module;
a scratchpad memory, coupled to said input/output module;
a programmable memory, coupled to said scratchpad memory; and
a control module, said control module coupled to said input/output module, said scratchpad memory and said programmable memory.

* * * * *

UNITED STATES PATENT AND TRADEMARK OFFICE
CERTIFICATE OF CORRECTION

PATENT NO.    : 5,994,770  
DATED         : November 30, 1999  
INVENTOR(S)   : Harrington et al.

Page 1 of 1

It is certified that error appears in the above-identified patent and that said Letters Patent is hereby corrected as shown below:

<u>Title page,</u>
Item [63], Related U.S. Application Data, replace "Continuation of application No. 08/262,071, Jun. 15, 1994, abandoned, which is a continuation of application No. 07/725,793, Jul. 9, 1991, abandoned." with -- Continuation of application No. 08/262,071, Jun. 15, 1994, abandoned, which is a continuation-in-part of application No. 07/725,793, Jul. 9, 1991, abandoned. --
OTHER PUBLICATIONS, replace "307542.1." with -- 307 542.1. --

<u>Column 10,</u>
Line 18, replace "is" with -- 1s --
Line 38, replace "is" with -- 1s --

Signed and Sealed this

Twenty-fourth Day of September, 2002

*Attest:*

*Attesting Officer*

JAMES E. ROGAN
*Director of the United States Patent and Trademark Office*